United States Patent [19]

Emanuelsen

[11] Patent Number: 4,811,460
[45] Date of Patent: Mar. 14, 1989

[54] IMPROVEMENT IN GUTTING MACHINES FOR FISH

[75] Inventor: Karl J. Emanuelsen, Hafrsfjord, Norway

[73] Assignee: Trio Industrier A/S, Forus, Norway

[21] Appl. No.: 134,226

[22] Filed: Dec. 17, 1987

[51] Int. Cl.[4] .............................................. A22C 25/00
[52] U.S. Cl. ............................................. 17/51; 17/58
[58] Field of Search ........................................ 17/58, 51

[56] References Cited

U.S. PATENT DOCUMENTS

| 1,103,809 | 7/1914 | Mischler . | |
|---|---|---|---|
| 1,224,923 | 5/1917 | Haubner . | |
| 1,306,841 | 6/1919 | Waugh . | |
| 1,309,923 | 7/1919 | Waugh . | |
| 2,345,607 | 4/1944 | Kaplan | 17/58 |
| 2,536,826 | 1/1951 | Taus | 17/58 X |
| 4,563,793 | 1/1986 | Ryan | 17/58 |
| 4,615,079 | 10/1986 | Chartrand | 17/58 X |

FOREIGN PATENT DOCUMENTS 90421 9/1957 Norway .
1366837 9/1974 United Kingdom .

Primary Examiner—Willie G. Abercrombie
Attorney, Agent, or Firm—Foley & Lardner, Schwartz, Jeffery, Schwaab, Mack, Blumenthal & Evans

[57] ABSTRACT

In a gutting machine, particularly for trout and salmon, wherein the fish is guided through the machine in swimming position, and wherein the machine comprises tools for cutting the belly, removal of the intestines, cutting of the abdominal membrane covering the blood rim, and removal of the blood rim, one has aimed to achieve removal of the blood rim substantially in one continuous piece without damaging the fish. This is achieved by means of one or more stationary, in the longitudinal direction of the machine (the feeding direction of the fish) resilient scraping or cutting means (7, 8) having bow or spoon shape.

7 Claims, 3 Drawing Sheets

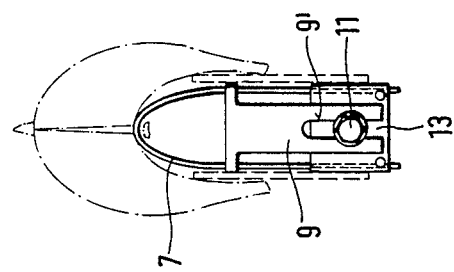
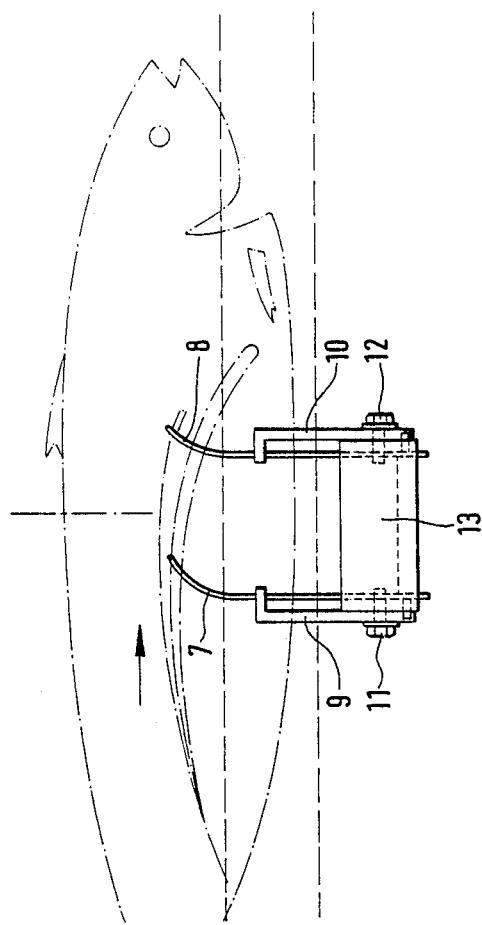

IMPROVEMENT IN GUTTING MACHINES FOR FISH

BACKGROUND OF THE INVENTION

The present invention relates to an improvement in gutting machines for fish, particularly trout and salmon.

Known machines for gutting fish are to a high degree constructed in view of treating fish to be further processed. Therefore, relatively moderate requirements may be made of the accuracy of the treatment performed by the machine.

For gutting trout and salmon, it is previously known machines wherein the fish is guided through the machine in swimming position by means of endless feed means such as belt or chains having vertical rotation axis and which grip the fish laterally and guide it through the machine. The fish is introduced into the gutting machine in that a spearlike means which is arranged centrally between the belts and points against the feeding direction of the fish, is treaded into the abdominal cavity through an opening exposed by cutting the fish's throat. The spear is subsequently treaded out through the anal orifice of the fish. The continuation of the spear constitutes the limitation for that part of the fish's belly being cut open by an underlying rotating circular blade.

As the fish is guided forwards by said belts, belly cutting, removal of intestines and cleaning are effected by means of a number of tools arranged one after the other in the longitudinal direction of the machine (the feeding direction of the fish) and each rotating around a horizontal rotation axis transversely of the longitudinal direction of the machine.

Some disadvantages are associated with these known machines.

Removal of the fish's blood rim constitutes a particular problem. The blood rim is protected by a strong abdominal membrane. In the known gutting machines this abdominal membrane is attempted to be removed by letting the fish pass over a rotating circular disc the circumference portion of which is formed with a number of recesses. Such a rotating circular disc is in a position to remove said abdominal membrane, but simultaneously it tears up the blood rim itself, so that it is not removed in one continuous piece. Additionally, the recesses of the circular disc will cause damages in the belly of the fish.

SUMMARY OF THE INVENTION

The object of the present invention is to provide a device which remedies these disadvantages.

The object is achieved in that the device according to the inveniton is formed in accordance with the features appearing from the following description and claims.

After the abdominal membrane covering the blood rim is cut, the blood rim, according to the invention, is removed substantially as a continuous piece by means of one or more stationary, resilient scraping or cutting means being formed to take out the blood rim substantially as one unit without causing damage to the fish. The scraping or cutting means may advantageously have the form of a resilient wire bow, but a resilient spoon-shaped embodiment is also possible. For example, two resilient steel wire bows may be used, and these may be vertically adjustable. These will engage between the fish's spinal bone and the blood rim cutting, out the blood rim substantially in one continuous piece.

The two steel wire bows may have a different curve, whereby good results are obtained on fish of varying sizes.

BRIEF DESCRIPTION OF THE DRAWINGS

The invention is explained in the following in association with an embodiment shown in the drawings, wherein:

FIG. 2 shows a fragmentary view of the machine in the region of the device for removing the blood rim from a fish being treated in the machine, in side elevation and on a larger scale;

FIG. 3 shows the device according to FIG. 2, seen in the longitudinal direction of the machine (the feeding direction of the fish);

DETAILED DESCRIPTION OF THE PREFERRED EMBODIMENTS

Figure 1:
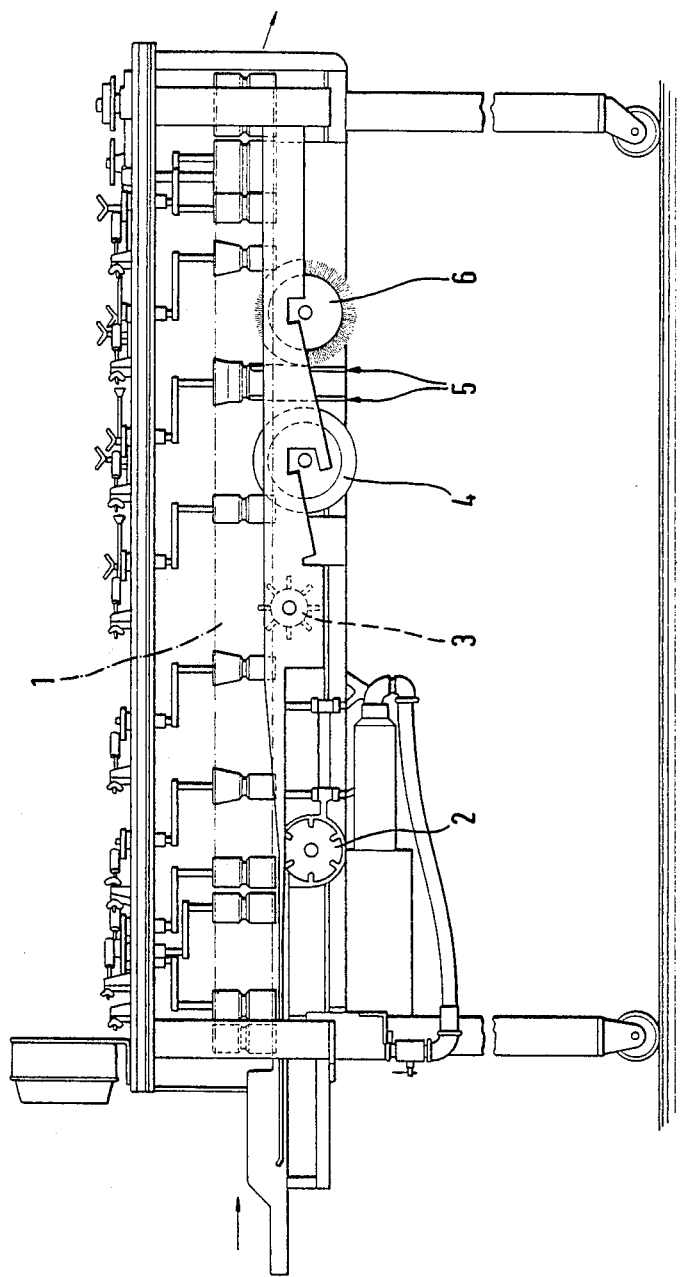
FIG. 1 shows a side view of a gutting machine for fish, especially trout and salmon.

The gutting machine shown in the drawings is particularly intended for gutting trout and salmon, and is of the kind wherein the fish is guided into the machine in swimming position, head first in the feeding direction, and is guided through the machine in this position by means of a pair of horizontally extending endless belts 1 having vertical rotation axis for the drive rollers. Such feeding devices are well known in fish processing machines and, accordingly, are not further described. They serve, as known, to pull the fish past working tools such as rotating circular blades, brush discs, etc., for belly cutting, removal of intestines, cleaning and so on.

During its advance, the fish, in the embodiment of the gutting machine shown in FIG. 1, at first comes in contact with an underlying rotating circular blade 2 serving to cut open the belly of the fish. Thereafter, the cut fish comes in contact with a socalled finger wheel 3, i.e. a rotating wheel having radially projecting fingers. This serves to remove the intestines. After the finger wheel 3 follows a rotating knife wheel 4 for cutting the abdominal membrane covering the blood rim, without damaging the blood rim itself. The blood rim is to be removed substantially in one continuous piece by the device according to the invention, generally denoted by the reference numeral 5, and which is further described subsequently with reference to FIG. 2-5. The reference numeral 6 in FIG. 1 denotes a rotary brush wheel for cleaning the belly of the fish.

The device 5 according to the invention serves, as mentioned, to remove the blood rim substantially in one continuous piece after the abdominal membrane covering the same, is cut.

Figure 4:
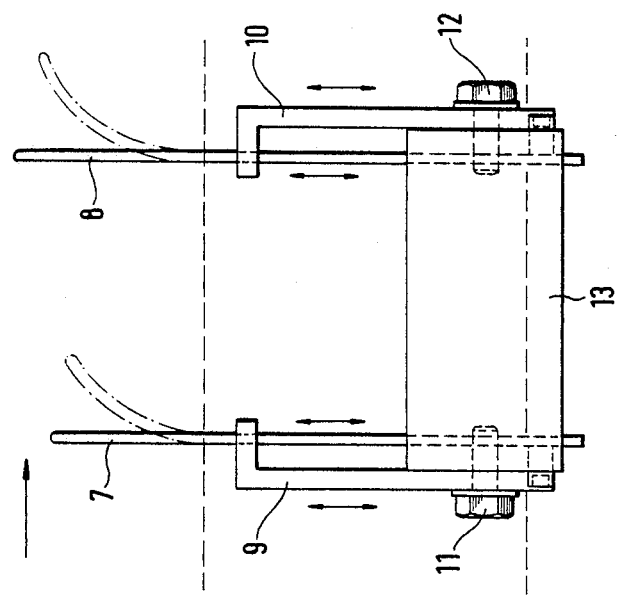
FIG. 4 corresponds to FIG. 2, but shows the device for removing the blood rim separately and on a larger scale.

In accordance with the embodiment of this device 5 being shown in FIG. 2-5, it comprises two stationary resilient scraping or cutting means in the form of two steel wire bows 7 and 8, arranged one after the other in the feeding direction of the fish, as indicated with an arrow in FIG. 2 and 4.

The resilient steel wire bows 7 and 8 are adjustable in height. They are each supported by a carrier 9 and 10, respectively. As it appears from FIG. 3 and 5 concerning the carrier 9, the carriers 9, 10 are each formed with a slit 9' extending in the direction of height. Through the slits pass screw bolts 11 and 12, respectively, being screwed into the machine frame 13 and serving to vertical adjustment of the steel wire bows 7, 8.

Figure 5:
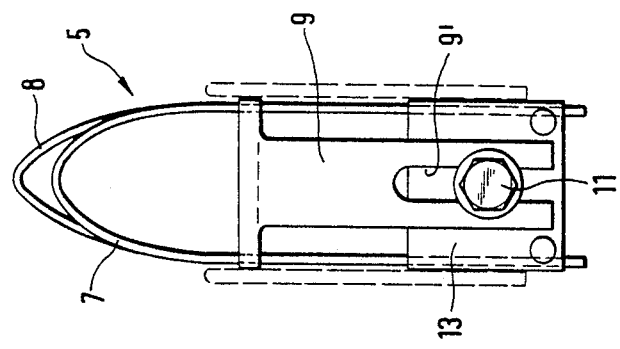
FIG. 5 shows the device according to FIG. 4, seen in the longitudinal direction of the machine, similar to FIG. 3.

The two resilient steel wire bows 7, 8 may have mutually differing curvature, as it appears from FIG. 5, whereby it may achieve good effect on fish of varying sizes.

Instead of bow shape, the scraping or cutting means for removal of blood rim may have spoon-shape. Other shapes are also possible. It is essential that the scraping or cutting means 7 and 8 are stationary and resilient.

I claim:

1. A method for gutting and cleaning fish, particularly trout or salmon comprising: guiding the fish in a swimming position sequentially through a series of cleaning operations, and washing the cavity of the fish with water as it is cleaned, cutting the fish belly, removing the fish intestines, cutting the abdominal membrane covering the blood rim, disposing a resilient scraping means in the abdominal cavity of the fish; said resilient scraping means being resilient in the swimming direction of the fish; resiliently scraping the fish abdominal cavity, and removing the blood rim substantially in one continuous piece to avoid contamination of the washing water with the blood.

2. A method according to claim 1 further comprising adjusting the elevation while resiliently scraping to accommodate fish of different size.

3. The method according to claim 1 further comprising disposing a plurality of resilient scraping means one after the other in the abdominal cavity of the fish along the swimming direction of the fish said plurality of resilient scraping means each having mutually differing curvature.

4. In a machine for gutting fish, particularly trout or salmon, wherein the fish is guided through the machine in swimming position in a longitudinal direction, said gutting machine comprising tools disposed, one after the other, in the longitudinal direction of the machine for cutting of the belly, removal of intestines, cutting of the abdominal membrane covering the blood rim and removal of the blood rim; the improvement comprising: means for removing the blood rim substantially in one continuous piece without damaging the fish, said removing means comprising at least one resilient scraping means, which is resilient in the longitudinal direction of the machine, in the form of a resilient wire bow and means for supporting said resilient scraping means in a stationary position with respect to the longitudinal direction of said machine.

5. The improvement according to claim 4 further comprising means for adjusting the height of said resilient scraping means.

6. The improvement according to claim 4 further comprising a plurality of resilient scraping means disposed one after the other in the longitudinal direction of the machine.

7. The improvement according to claim 6 wherein said resilient scraping means disposed one after the other have mutually differing curvature.

* * * * *